US008587976B2

(12) United States Patent
Rigbers (10) Patent No.: US 8,587,976 B2
(45) Date of Patent: Nov. 19, 2013

(54) DC/DC CONVERTER WITH AUXILIARY CONVERTER FOR EARTH CURRENT COMPENSATION

(75) Inventor: Klaus Rigbers, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 13/342,343

(22) Filed: Jan. 3, 2012

(65) Prior Publication Data

US 2012/0113702 A1     May 10, 2012

Related U.S. Application Data (63) Continuation of application No. PCT/EP2010/058817, filed on Jun. 22, 2010.

(30) Foreign Application Priority Data

Jul. 2, 2009   (EP) .................................. 09164447

(51) Int. Cl.
   *H02M 7/5387*   (2007.01)

(52) U.S. Cl.
   USPC ................................ 363/132; 363/41; 363/98

(58) Field of Classification Search
   USPC ........ 363/123, 132, 98, 74, 16, 21.02, 39, 41, 363/131
   See application file for complete search history.

(56) References Cited

U.S. PATENT DOCUMENTS 5,784,269 A * 7/1998 Jacobs et al. .................... 363/89
7,440,300 B2 * 10/2008 Konishi et al. ................ 363/132

| | | | |
|---|---|---|---|
| 2003/0169027 A1 | 9/2003 | Croce et al. | |
| 2007/0091648 A1 | 4/2007 | Johnston | |
| 2009/0034304 A1 | 2/2009 | Engel et al. | |
| 2010/0008105 A1 | 1/2010 | Mallwitz et al. | |
| 2012/0281441 A1 * | 11/2012 | Liu et al. | 363/35 |

FOREIGN PATENT DOCUMENTS

| | | | |
|---|---|---|---|
| CA | 2431689 A1 | 12/2004 | |
| EP | 0398722 A2 | 11/1990 | |
| EP | 0696841 A1 | 2/1996 | |

(Continued)

OTHER PUBLICATIONS

Alexander I. Julian, et al., "Elimination of Common-Mode Voltage in Three-Phase Sinusoidal Power Converters", IEEE Transactions on Power Electronics, vol. 14, No. 5, Sep. 1999, p. 982-989.

Joep Jacobs, et al., "A Novel Three-Phase DC/DC Converter for High-Power Applications", 2004 35th Annual IEEE Power Electronics Specialists Conference, p. 1861-1867.

(Continued)

Primary Examiner — Adolf Berhane
Assistant Examiner — Yemane Mehari
(74) Attorney, Agent, or Firm — Eschweiler & Associates, LLC (57) ABSTRACT

A DC/DC converter for converting an input DC voltage between input lines into an output DC voltage between output lines includes: an AC current forward path connected via switching electric components to at least one of the output lines and at least one of the output lines; an AC current backflow path connected via same electric connections to at least one of the input lines and at least one of the output lines; and an auxiliary converter for compensating a sum of currents flowing via all forward and backflow paths, the auxiliary converter connecting one end of an compensation current path via two pulsed switches alternately to two lines at one side, the other end of the compensation path being connected to at least one line at the other side of the converter. The input lines are galvanically separated from the output lines by capacitances in all current paths.

16 Claims, 4 Drawing Sheets

(56) References Cited

FOREIGN PATENT DOCUMENTS

| EP | 2023475 | A1 | 2/2009 |
| EP | 2144358 | A1 | 1/2010 |
| GB | 1506633 | A | 4/1978 |
| WO | 0180411 | A1 | 10/2001 |

OTHER PUBLICATIONS

Satoshi Ogasawara, et al., "An Active Circuit for Cancellation of Common-Mode Voltage Generated by a PWM Inverter", IEEE Transactions on Power Electronics, vol. 13, No. 5, Sep. 1998, p. 835-841.
International Preliminary Report on Patentability for PCT/EP2010/058817 dated Jun. 22, 2010, p. 1-22.

* cited by examiner

DC/DC CONVERTER WITH AUXILIARY CONVERTER FOR EARTH CURRENT COMPENSATION

CROSS REFERENCE TO RELATED APPLICATIONS

This application is a continuation of International Application number PCT/EP2010/058817, filed Jun. 22, 2010 which claims priority to European Patent Application number 09164447.6, filed Jul. 2, 2009.

FIELD OF THE INVENTION

The invention relates to a DC/DC converter for transforming an DC input voltage present between two input lines at an input side of the DC/DC converter into an DC output voltage present between two output lines at an output side of the DC/DC converter.

BACKGROUND

An inverter for feeding electric energy from a DC generator into an AC power grid is known from EP 2 023 475 A1. Here, the DC/DC converter supplies at least two bipolar output DC voltages that are additively superimposed between the input lines of the inverter with regard to an earthed center point. Particularly, there are resonant circuits which are each branched and comprise two partial resonance capacitances. Each of these two partial resonance capacitances is connected to two rectifier diodes at its output, and it is thus alternately electrically conductively connected to the two lines of one division of a divided DC voltage link. An inverter bridge of the inverter is connected to the divided DC voltage link. In this way, the known inverter comprises a basic converter ratio for the DC input voltage present between the input lines of the entire inverter as compared to a DC link voltage present between the input lines of the actual inverter bridge of 1:n, wherein n is the total number of the partial resonance capacitances towards which the resonant circuits are branched. In other words, n corresponds to the number of divisions of the divided DC link out of which the inverter bridge is fed. This basic converter ratio for the input DC voltage will prove to be disadvantageous when the known inverter is to be used for feeding electric energy from a photovoltaic module into an AC power grid, if the DC voltage provided by the photovoltaic module is already higher or at least as high as the peak voltage of the AC power grid. Some photovoltaic panels presently used provide such a high DC voltage that the peak voltage of an AC power grid to be fed is already exceeded by a multiple.

Not all embodiments of the inverter known from EP 2 023 475 A1 comprise a galvanic separation between the input lines of the inverter which are the input lines of its DC/DC converter, and the input lines of its inverter bridge which are the output lines of its DC/DC converter. In some embodiments, both the center point of the divided DC voltage link and one of the input lines of the DC/DC converter are grounded, resulting in a grounding extending beyond the DC voltage link.

In the embodiments of the inverter known from EP 2 023 475 A1 which comprise a galvanic separation, the center point of the divided voltage link is connected to the input lines of the inverter bridge via capacitances, and it is connected to an intermediate point between the input lines of the inverter which is—also via capacitances—connected to these input lines of the inverter. Via this additional connection, a passive AC current backflow path is provided which—due to its pure capacitive connection to the input lines of the inverter—does not remove the galvanic separation between the input lines of the entire inverter and the input lines of its inverter bridge.

In the embodiments of the inverter known from EP 2 023 475 A1 in which the input lines of the entire inverter are galvanically separated from the input lines of its inverter bridge and thus from the output lines of the entire inverter, a reference potential for the input DC voltage may be freely selected. There is, however, the danger that the current sum of the currents flowing via the resonant circuits and the passive AC current backflow path is not balanced to zero and that thus undesired, quite high compensation currents may flow via ground.

For example, common mode currents via the DC/DC converter unavoidably occur if, in a DC/DC converter whose output side is capacitively decoupled from its input side, the input side has a fixed potential with reference to ground due to grounding one of its input lines, whereas the potential of its output side with reference to ground periodically changes due to being connected to an inverter bridge which feeds into an AC power grid having a defined potential with reference to ground.

A variant of a so-called Single-Ended Primary Inductance Converter (SEPIC) with galvanic separation due to an additional capacitance in an AC current backflow path is known from EP 0 696 841 A1. Here, there also is the danger that the current sum of the currents flowing via the AC current forward path and the passive AC current backflow path are not balanced to zero and thus undesired compensation currents have to flow via earth.

There still is a need for a DC/DC converter in which compensation currents via ground can be principally avoided.

SUMMARY OF THE INVENTION

The invention relates to a DC/DC converter for converting an input DC voltage present between two input lines at an input side of the DC/DC converter into an output DC voltage present between two output lines at an output side of the DC/DC converter. The DC/DC converter comprises at least one AC current forward path which is, via electric components, connected at its input end to the input lines and at its output end to the output lines. At least one of the electric components is between the AC current forward path and at least one of the input lines, and at least one of the electric components is between the AC current forward path and at least one of the output lines are switching electric components. At least one of these switching electric components is actively operated, and at least one AC current backflow path for a backflow of current flowing off via the AC current forward path is provided, wherein the at least one AC current backflow path is connected via at least one input side connection to at least one of the input lines at its input end and via at least one output side connection to at least one of the output lines at its output end. The input side and the output side connections are same connections selected from a group of connections of electrically conductive connections and switching connections, and at least one auxiliary converter for compensating a current sum of currents flowing via at least one AC current forward path and at least one AC current backflow path is provided. The at least one auxiliary converter electrically conductively connects one end of an additional compensation current path which runs in parallel to at least one AC current forward path and at least one AC current backflow path via two pulsed switches alternately to two lines at one side of the DC/DC converter, wherein the other end of the compensation current path is permanently electrically conductively connected to at least one line at the other side of the DC/DC converter via at least one connection capacitance. The input lines are galvanically separated from the output lines by capacitances arranged in the AC current paths including the AC current forward paths, the AC current backflow paths and the compensation current paths.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Particularly, the invention concerns such DC/DC converters which, even without a transformer connected in between, provide for a galvanic separation of their input lines from their output lines, i.e. so called transformerless DC/DC converters with galvanic separation. Even more particularly, the input lines and the output lines of the DC/DC converter are galvanically separated from each other in a capacitive way, i.e. by means of capacitances.

A DC/DC converter to which the present invention relates may particularly be part of a DC voltage input stage of an inverter for feeding electric energy from a DC generator into an AC power grid. In so far, the present invention also relates to so called transformerless inverters with galvanic separation.

The DC generator, from which the electric energy comes, may particularly be a photovoltaic generator, like for example a string or a plurality of strings each comprising a multitude of photovoltaic modules. The DC generator, however, may also be a capacitor of a very high capacitance, i.e. a so-called supercap, a rotating generator or a fuel cell stack, for example. The AC power grid, into which the electric energy from the DC generator is fed, may be a single-phase or multi-phase, particularly a three-phase AC power grid. The AC power grid may either be a public power grid or an island power grid or any other variant of a power grid.

The DC/DC converter according to the present invention may also be used outside the field of feeding electric energy into AC power grids in multiple ways. When used in the field of feeding electric energy into an AC power grid, it may be combined with other circuits upstream or downstream, like for example with one or more further DC/DC converters, particularly with a buck or boost converter. A particular reason for using the DC/DC converter according to the present invention may be an increased bandwidth of the converter ratio of the overall circuitry.

So far as the term "connectable", particularly within the formulation "electrically conductively connectable", is used in this description or the attached claims, this term does not refer to the trivial possibility of connecting the two components of the DC/DC converter that are indicated in the context of this term in any (electrically conductive) way with each other. Instead, this term means that the respective connection is already prepared in the DC/DC converter and only needs to be activated—by closing a switch or by a diode becoming electrically conductive, for example—even if this is not explicitly mentioned for more closely explaining the "connectability" in the particular case.

So far as the term "electrically conductive", particularly within the formulation "electrically conductive connection", is used in this description or the attached claims, this term means that the components of the DC/DC converter that are indicated in the context of this term are permanently connected to each other in such a way that an AC current can flow between them. The connection may either be a galvanic one or a capacitive one.

So far as the term "switching", particularly within the formulation "switching connection", is used in this description or the attached claims, this term does not necessarily indicate that the connection that is indicated in the context of this term is actively switched. For actively switched connections or switches the terms "pulsed" or "operated" are used here. A switching connection may also switch passively, and it may, for example, be provided by a diode.

So far as the formulation "intermediate potential input or output line which carries an intermediate potential between the input or output lines" is used in this description or the attached claims, this formulation means that the intermediate potential lines that are indicated in this formulation are (in the above sense) electrically conductively connected to the two input or output lines and thus are arranged between them with regard to their electric potential.

So far as the terms "capacitance" and "inductance" are used in this description or the attached claims for components of the DC/DC converter, these terms mean "one or more capacitors connected in any way which provide an electric capacitance" and "one ore more inductors or chokes connected in any way which provide an electric inductance", respectively.

To get rid of the problem of ground currents in the DC/DC converter of the present invention, a current sum of at least one current flowing via at least one DC current forward flow path and at least one DC current backflow path, i.e. the unbalanced current sum which would otherwise have to be compensated via ground is compensated by means of an auxiliary converter that connects a compensation current path that runs in parallel to at least one AC current forward flow path and at least one AC current backflow path alternately via two pulsed switches with two lines at one side of the DC/DC converter, i.e. to two input side lines or alternately with the two output lines of the DC/DC converter, in an electrically conductive way. Thus, the auxiliary converter comprises a switching bridge between the input side lines or the output lines of the DC/DC converter.

At its end opposite to the pulsed switches, the compensation current path is connected to at least one line at the other side of the DC/DC converter, i.e. to at least one of the output lines or to an intermediate potential line carrying a potential lying in between, or to one of the input lines or an intermediate potential line carrying a potential lying in between. The potential of such an intermediate potential line is defined with regard to the potentials of the output or input lines. If two capacitors are used for this purpose, they may form the connection capacitances via which the compensation current path is connected to the output or input lines.

At its end which is opposing the pulsed switches, the compensation current path is connected to the line or lines on this side of the DC/DC converter without interconnection of switching electrical components. Thus, it differs from any AC current forward path which comprises at least one switching electrical component at both of its ends, and also from any AC current backflow path which is connected to the input and output lines at both of its ends in a same way, i.e. either in a permanently electrically conductive way or via switching electrical components.

In one embodiment the auxiliary converter may be configured to transfer a part of the entire current flowing via the DC/DC converter. Typically, it does not transfer more than 10%, most times not more than 5%, and often even clearly less than 5% of the current actually flowing via at least one AC current forward flow path. The backflow of this current essentially takes place via the one or the plurality of AC current backflow paths. In one embodiment, only that part of the current that is not automatically flowing back via the AC current backflow paths has to be actively fed back via the auxiliary converter to avoid compensation currents via ground. In the temporal average, the current flowing via the compensation current path and the electrical energy transferred via this way are zero. Thus, the constructional efforts for the auxiliary converter including the compensation current path are limited.

The auxiliary converter may be controlled in a simple way in one embodiment such that the current sum of at least one current flowing via at least one AC current forward flow path and at least one AC current backflow path is balanced or compensated to zero which—due to the fact that the currents flowing via these current paths and via the compensation current path are all of a high frequency—may be monitored by means of an induction coil, for example, in which a current is induced, when an alternating magnetic field is induced in a ring core enclosing all current paths, in one embodiment, and thus functioning as a current sum converter. The measurement of the current sum to be regulated to zero may, instead of over at least one AC current forward flow path, at least one AC current backflow path and at least one compensation current path (in one embodiment, all the paths), also be made over all input or all output lines of the DC/DC converter and over any other group of conductors carrying the entire current. The current sum or the compensation current via ground to be suppressed that is represented by the current sum may often also be modeled by operation data of an inverter connected downstream of the DC/DC converter, for example, so that an actual measurement of the current sum or of the compensation current via ground to be suppressed is not even a condition for its proper compensation.

Particularly, a controller of the auxiliary converter may operate the pulsed switches according to the principle of pulse width modulation, i.e. close them for different periods of time at a fixed frequency. The algorithm according to which the controller compensates the current sum to zero may be defined in one embodiment by a closed loop that at least comprises a proportional element. Additionally, the closed loop may be resonant, and it may comprise an additional integral and/or differential element. The closed loop controller may be realized in a digital way in form of a microcontroller, a microprocessor, a programmable chip and/or a so-called ASIC in one embodiment. It is also possible to build up the controller in an analogous way by using operational amplifiers.

In one embodiment an inductance may also be provided in the compensation current path besides the connection capacitance to adjust the passive properties of the compensation path. Such an inductance is located in one embodiment at that side of the connection capacitance that is facing towards the switches of the auxiliary converter.

For tuning its passive properties, the compensation current path may additionally be connected to one of the input side lines or one of the output lines of the DC/DC converter, respectively, at that side comprising pulsed switches, via a coupling capacitance arranged in parallel to one of the pulsed switches. The coupling capacitance may be connected to the compensation current path between the inductance and the connection capacitance.

On the side opposing the pulsed switches, the compensation current path is connected to one of the output lines or one of the input side lines of the DC/DC converter, respectively.

The auxiliary converter according to one embodiment of the present invention may be used for ground current compensation in generally all DC/DC converters with galvanic separation. Its use in such DC/DC converters in which the galvanic separation is effected in a capacitive way. The SEPIC variant known from EP 0 696 841 A1 and all embodiments of the DC/DC converter with galvanic separation known from EP 1 023 475 A1 belong to these DC/DC converters.

In one embodiment, the DC/DC converter according to the invention may include at least one resonant circuit comprising a resonance inductance and a resonance capacitance which—at its input side—is electrically conductively connectable via at least two pulsed switches to two input side lines of the DC/DC-converter.

Differing from the teaching of EP 2 023 475 A1, in one embodiment this resonant circuitry is undivided, i.e. alternately directly connectable to the two input lines of an downstream inverter bridge in an electrically conductive way. This is equal so that the DC voltage link of the new DC/DC converter is also undivided, and that the basic converter ratio of the new DC/DC converter—except for the possibility to provide boost converters—is 1:1 at maximum. Thus, it is particularly suited for DC generators that provide a high input DC voltage.

In the new DC/DC converter, the reference potential for the output DC voltage is also freely selectable. Particularly, the output DC voltage is not automatically provided with reference to a grounded center point.

If the resonant circuit is undivided this does not mean here that the resonance capacitance may not be provided by two or more individual capacitors that are connected in series and/or also in parallel as long as the total capacitance provided at the output of the resonant circuit is undivided, i.e. as long as the resonant circuit does not comprise a plurality of separate outputs with several partial capacitances.

In the DC/DC converter of one embodiment, the order of the resonance inductance and the resonance capacitance may also be changed so that the resonance capacitance is at the input and the resonance inductance is at the output of the resonant circuit. Although this inverted order is not reflected by the following embodiment examples, it is of a same value as the order depicted there.

In the DC/DC converter according to one embodiment of the invention, cascading of the basic principle explained in the two preceding paragraphs is possible in that several resonant circuits are connected in parallel at their output side to the same output lines. At their input, these resonant circuits may be connected to at maximum one of the two input lines of the DC/DC converter and to one or two intermediate potential lines that carry an intermediate potential lying in between, each via a pulsed switch. Starting from the third resonant circuit, there is at least one resonant circuit which, at its input, via its two pulsed switches, is alternately connected to two intermediate potential lines in an electrically conductive way. Any such resonant circuit, at its output, is alternately connectable to the two output lines in an electrically conductive way. This cascading may be interpreted as an inversion of the cascading known from EP 2 023 475 A1.

In the DC/DC converter according to one embodiment of the invention, the resonance capacitance at the output of the resonant circuit may be connected to the two output lines or to intermediate potential lines carrying a potential lying in between via individual rectifier diodes, wherein the electrically conductive connection is passively provided depending on the direction of the potential difference across the rectifier diodes. A higher level of controllability of the DC/DC converter of the present invention results, if the resonance capacitance at the output of the resonant circuit is alternately connected to the output lines or to intermediate potential output lines carrying an intermediate potential via pulsed switches in an electrically conductive way. Free-wheeling diodes may be connected in parallel to these pulsed switches in one embodiment.

The AC current backflow path of the DC/DC converter with resonant circuit may be electrically conductively connected or connectable to the input lines of the DC/DC converter or to the intermediate potential input lines at its input and to the output lines of the DC/DC converter or to the intermediate potential output lines at its output. Via this AC current backflow path, the currents flowing via the DC/DC converter are already compensated to a large extent. Here, it is of general relevance, i.e. of advantage even with a divided DC voltage link according to the prior art, if in the AC current backflow path, between its branching towards the input lines of the DC/DC converter on the one hand and its branching towards the output lines of the DC/DC converter on the other hand, a capacitance is provided that galvanically separates the two branchings from each other. This capacitance provides for a galvanic separation independently of how the branchings of the AC current backflow path towards the lines at its input side and its output side are executed in detail.

If the DC/DC converter of the invention comprises several resonant circuits in one embodiment, one AC current backflow path is associated with each resonant circuit to return the current flowing via the resonant circuit to an as high extent as possible. Each of these AC current backflow paths, at its input side and its output side, is electrically conductively connected or connectable to the same lines to which the associated resonant circuit is electrically conductively connectable.

In one embodiment the compensation current path, even if it comprises an inductance in addition to the connection capacitance is not designed as a resonant circuit. That is, it particularly does not comprise the same resonance frequency as any of the AC current forward paths designed as a resonant circuit.

The AC current backflow path may be connected to the input lines or the intermediate potential input lines at its input and to the output lines or the intermediate potential output lines at its output each via two capacitances. In this way, a completely passive AC current backflow path is provided. Several such AC current backflow paths may be connected to the output lines via the same two capacitances.

However, in one embodiment of the DC/DC converter, the AC current backflow path is made as actively as the resonant circuit in that it is connected at least at its input side or its output side via two switches to the input lines or the intermediate potential input lines, or the output lines or the intermediate potential output lines, respectively, to have further options in influencing the output DC voltage and the current flowing over the DC/DC converter. On the respective other side, the AC current backflow path may also be connected to the output lines or the intermediate potential output lines, or the input lines or the intermediate potential input lines, respectively, via switches or also only via rectifier diodes. So far as switches are provided at the input side or output side here, they may be connected in parallel with free-wheeling diodes.

In that the galvanic decoupling is already effected by means of the capacitance arranged between the input side and output side branchings in the AC current backflow path according to the invention, the input side and output side connections of the AC current backflow path may be designed free from the task of galvanic decoupling.

In one embodiment of the DC/DC converter, the AC current backflow path between its input side branching towards the input lines or to the intermediate potential input lines and its output side branching towards the output lines or the intermediate potential output lines, there is not only a capacitance but also a resonance inductance so that the AC current backflow path is designed as a further resonant circuit. This further resonant circuit may in principle have the same parameters as the associated resonant circuit. The order of the capacitance and the resonance inductance is also of no particular relevance in the further resonant circuit; it may particularly be selected independently on the order of the resonance capacitance and the resonance inductance in the resonant circuit associated to the respective AC current backflow path in one embodiment.

The DC/DC converter according to one embodiment of the present invention comprises additional control options with regard to the output DC voltage, if a pulsed connection switch is provided between each resonant circuit and its associated AC current backflow path at their input sides after their branching towards the two input lines or the intermediate potential input lines and/or at their output sides prior to their branching towards the two output lines or the intermediate potential output lines. Operation of such an input side connection switch has a bucking or output voltage reducing effect, and operation of such an output side connection switch has a boosting or output voltage decreasing effect. Instead of only one connection switch, two connection switches connected in series at the input side and/or the output side whose center points are connected to an intermediate potential which is defined by capacitances connected in series between the input lines or the output lines of the DC/DC converter may be provided, for example. Then, the inputs or the outputs of the resonant circuit and of the associated AC current backflow path are not only connectable with each other but also individually to this intermediate potential.

The properties of the DC/DC converter according to the invention may also be positively influenced in that each resonant circuit and the associated AC current backflow path at their output side prior to their branching towards the two output lines or the intermediate potential output lines via a capacitance and/or inductance are connected with each other.

In a particular embodiment of the DC/DC converter according to the invention, each resonant circuit and the associated AC current backflow path are at their input side electrically conductively connectable via two pulsed switches at each time with one of the two input lines or one intermediate potential input line carrying a potential lying in between, wherein a further pulsed switch is arranged in one of the input lines or the intermediate potential input lines. In this way, a so-called H5 circuitry is realized at the input of the new DC/DC converter. Such an H5 circuitry may also be provided in the area of a downstream inverter bridge. Similarly, other known circuitry concepts may be used in the DC/DC converter and the inverter bridge. Thus, the DC/DC converter may, for example, be a three-level NPC (Neutral Point Clamped) converter. Other applicable circuitry principles are known under the headwords "Heric" and "Flying Capacitor".

Figure 1:
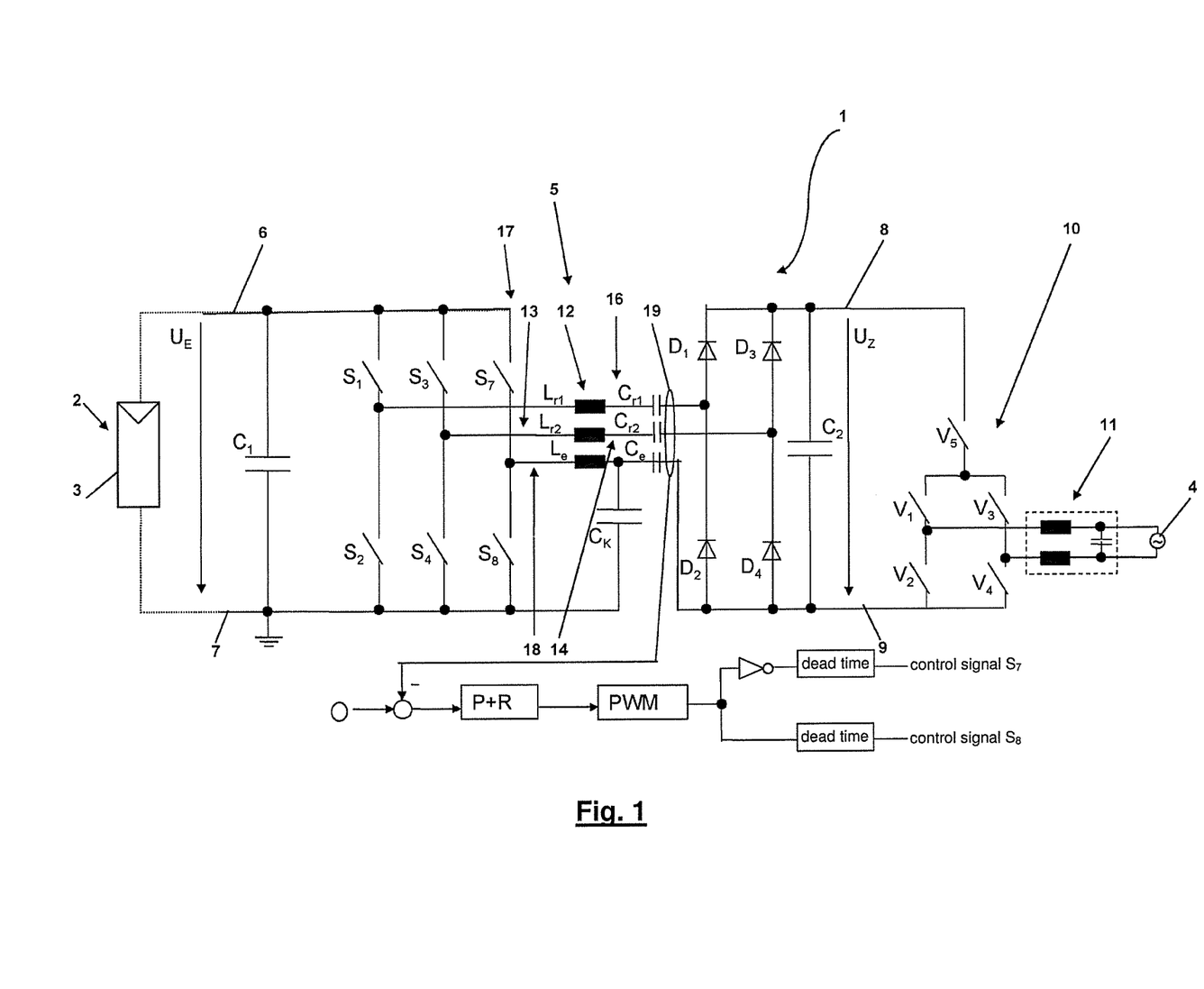
FIG. 1 illustrates a transformerless inverter comprising a first embodiment of the DC/DC converter according to the present invention.

Now referring in greater detail to the drawings, FIG. 1 illustrates an inverter 1 which serves for feeding electric energy from a DC generator 2, like for example a photovoltaic generator 3, into an AC power grid 4. In this embodiment example, the AC power grid 4 is a single-phase grid. The inverter 1 comprises a DC/DC converter 5 that converts an input DC voltage $U_E$ present between inputs lines 6 and 7 into an output DC voltage $U_Z$. The output DC voltage $U_Z$ is present between output lines 8 and 9 of the DC/DC converter 5 which are at the same time input lines of an inverter bridge 10 of the inverter 1. The inverter bridge 10 feeds the electric energy into the AC power grid 4. A sine filter 11 is connected between the inverter bridge 10 and the AC power grid 4 to sine filter the AC current output of the inverter bridge 10. The inverter bridge 10 inverts the output DC voltage $U_Z$ which is the link voltage of a voltage link comprising a capacitance $C_2$ between the DC/DC converter 5 and the inverter bridge 10 into an output DC voltage. The inverter bridge 10 is designed as a H5 circuitry here and thus comprises a total of five pulsed switches $V_1$ to $V_5$ that are controlled in a generally known way to feed electric energy starting from the output DC voltage $U_Z$ into the AC power grid 4. The DC/DC converter 5 comprises a resonant circuit 12 including a resonance inductance $L_{r1}$ and a resonance capacitance $C_{r1}$. At its input side, this resonant circuit 12 is alternately connected to the input lines 6 and 7 of the inverter 1 via two pulsed switches $S_1$ and $S_2$ to which free-wheeling diodes may be connected in parallel. At its output side, the resonant circuit 12 is alternately electrically conductively connected to the input lines 8 and 9 of the inverter bridge 10 via rectifier diodes $D_1$ and $D_2$. In parallel, or more precisely in anti-parallel, to the resonant circuit 12, an AC current backflow path 13 is provided which is connected to the same lines 6 and 7 on the one hand as well as 8 and 9 on the other hand as the resonant circuit 12, and which allows the current flowing off via the resonant circuit 12 to flow back to the DC generator 2. A capacitance $C_{r2}$ is provided in the AC current backflow path 13 which, together with the resonance capacitance $C_{r1}$ provides for a complete galvanic separation between the input lines 6 and 7 of the inverter 1 and the input lines 8 and 9 of the inverter bridge 10. Further, a resonance inductance $L_{r2}$ is provided in the AC current backflow path 13 here, which makes a further resonant circuit 14 of the AC current backflow path 13. At its input, the AC current backflow path 13 is connected to the input lines 6 and 7 via two further pulsed switches $S_3$ and $S_4$ here to which free-wheeling diodes may also be connected in parallel. At the output side, the AC current backflow path 13 is connected to the input lines 8 and 9 of the inverter bridge 10 via rectifier diodes $D_3$ and $D_4$. Thus, the AC current backflow path 13 is made in the same way as the resonant circuit 12. By means of the switches $S_1$ and $S_2$, and $S_3$ and $S_4$, respectively, these two resonant circuits 12 and 14 are forced to anti-phased oscillations. In that the AC current backflow path 13 is also, at least at one side, connected to the input lines 6 and 7 via pulsed switches $S_3$ and $S_4$ here, there is an additional option for influencing the current flowing in total via the resonant circuit 12 and the AC current backflow path 13. Buffer capacitances $C_1$ and $C_2$ are provided between the input lines 6 and 7 and the output lines 8 and 9.

The basic converter ratio of the DC/DC converter 5 between the input DC voltage $U_E$ and the output DC voltage $U_Z$ is about 1:1. By a pulsed connection of the resonant circuit 12 and the AC current backflow path 13 downstream of their branchings via the switches $S_1$ and $S_2$, and the switches $S_3$ and $S_4$, respectively, towards the input lines 6 and 7 by means of a switch (not depicted here), the link voltage $U_Z$ may be decreased, to have a further option of adapting the inverter 1 to the input DC voltage $U_E$ generated by the DC generator 12 in addition to controlling the switches $S_1$ and $S_2$ as well as $S_3$ and $S_4$ with regard to the resonance frequency of the resonant circuit 12. By means of a further switch (also not depicted here) by which the resonant circuit 12 and the AC current backflow path 13 are electrically conductively connectable upstream of their output side branchings towards the output lines 8 and 9, it is possible to increase or boost the output DC voltage $U_Z$. Instead of such an output side switch between the resonant circuit 12 and the AC current backflow path 13, a connection via an additional series circuit of a capacitance and inductance may be provided at this point which has a positive influence on the passive properties of the DC/DC converter 5. Instead of both providing a capacitance and an inductance here, only a single capacitance or only an inductance may be provided. In this context it is to be noted that the resonance inductance $L_{r2}$ in the AC current backflow path 13 is in principle just an option. Further, the switches $S_1$ to $S_4$ may be complemented by a further switch in one of the input lines 6 and 7 in the way of a H5 circuitry. This additional switch may also be operated in a pulsed way for reducing the output DC voltage $U_Z$. In total, already the embodiment of the inverter 1 according to FIG. 1 comprises a variety of options for influencing the output DC voltage $U_Z$.

Additionally, the DC/DC converter 5 may have two or more resonant circuits 12 which may as such be made of resonance inductances $L_{r1}$ and resonance capacitances $C_{r1}$ in an identical way and which may be connected to the output lines 8 and 9 in parallel to each other, like, for example, via rectifier diodes $D_1$ and $D_2$. AC current backflow paths 13 assigned to or associated with the individual resonant circuits 12 may, at their output side, i.e. towards the output lines 8 and 9, be connected in parallel to each other. Alternatively, they may be connected together here and connected to the output lines via common capacitances. At their input side, the resonant circuits 12 and the associated AC current backflow paths 13, however, in one embodiment are not connected to both input lines 6 and 7 of the inverter 1 but, via switches $S_1$ and $S_2$, each at maximum to one of the two input lines 6 and 7 and to one intermediate potential input line carrying a potential lying between the input lines 6 and 7. At such an intermediate potential line there is an intermediate potential defined by capacitances. Correspondingly, the inverter 1 then comprises a basic converter ratio of n:1, wherein n is the number of the resonant circuits 12 connected in parallel.

As a characteristic feature of the DC/DC converter 5 according to the invention, an auxiliary converter 17 is provided to compensate for a current sum of the currents flowing via the resonant circuit 12 and the AC current backflow path 13 so that they do not provoke any compensation current via ground. The auxiliary converter comprises two pulsed switches $S_7$ and $S_8$ by which a compensation current path 18 is alternately connected to the input lines 6 and 7 at its input side, here. The compensation current path 18 runs in parallel to the resonant circuit 12 and the AC current backflow path 13. In the compensation current path 18, a connection capacitance $C_e$ is arranged via which the compensation current path 18 is connected to the input line 9 of the inverter bridge 10, here. Additionally, the compensation current path 18 is connected to the input line 7 which is grounded via a coupling capacitance $C_K$ here; and an inductance $L_e$ is provided in the compensation current path 18 between the capacitances $C_e$ and $C_K$ on the one hand and the switches $S_7$ and $S_8$ on the other hand. By means of the capacitances $C_e$ and $C_K$, the galvanic separation is ensured also along the compensation current path 18. A controller 20 for controlling the pulsed switches $S_7$ and $S_8$ of the auxiliary converter 17 regulates the current sum of the currents flowing over the DC/DC converter 5 towards zero. In a ring core 19 and an induction coil as a current sum converter which is not depicted here, an input signal for the controller 20 is generated.

Figure 2:
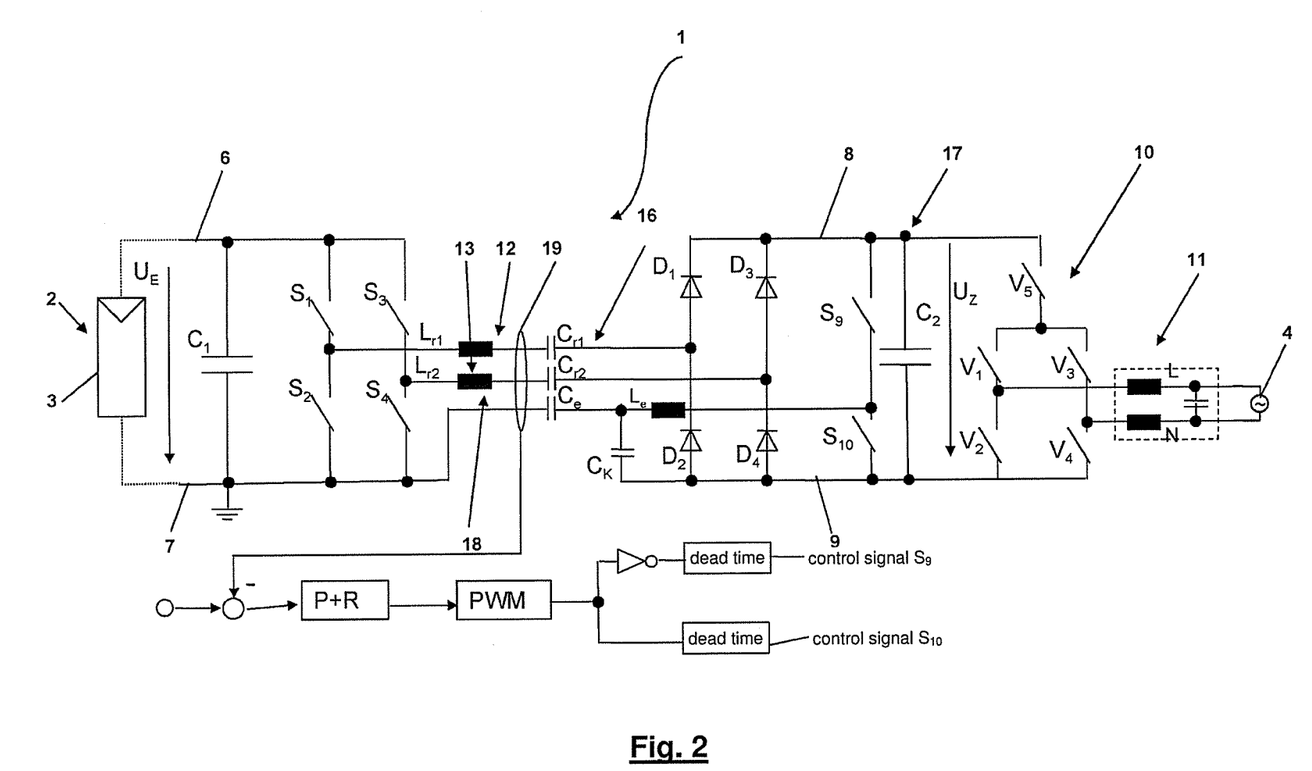
FIG. 2 illustrates another transformerless inverter comprising a second embodiment of the DC/DC converter according to the present invention.

In the embodiment of the inverter 1 according to FIG. 2 the compensation current path 18 with the auxiliary converter 17 is, in contrast to FIG. 1, connected to the input lines 8 and 9 of the inverter bridge 10 via pulsed switches $S_9$ and $S_{10}$. Correspondingly, it comprises the inductance $L_e$ at the output side of the connecting capacitance $C_e$, and the coupling capacitance $C_K$ is also provided towards the input line 9 of the inverter bridge 10. The compensation current path 18 is here directly connected to the input line 7. The controller 20 for the switches $S_9$ and $S_{10}$, however, essentially corresponds to the controller 20 for the switches $S_7$ and $S_8$ according to FIG. 1. However, only one of several options for executing the controller 20 is illustrated here. If several resonant circuits 12 and associated AC current paths 13 are connected in parallel, in one embodiment only a single auxiliary converter 17 and a single compensation current path 18 are provided, although, in principle, one such combination of an auxiliary converter 17 and a compensation current path 18 could be provided per each pair of one resonant circuit 12 and its associated AC current backflow path 13 to individually compensate the partial current sums flowing over this pair of current paths 12 and 13 to zero.

Figure 3:
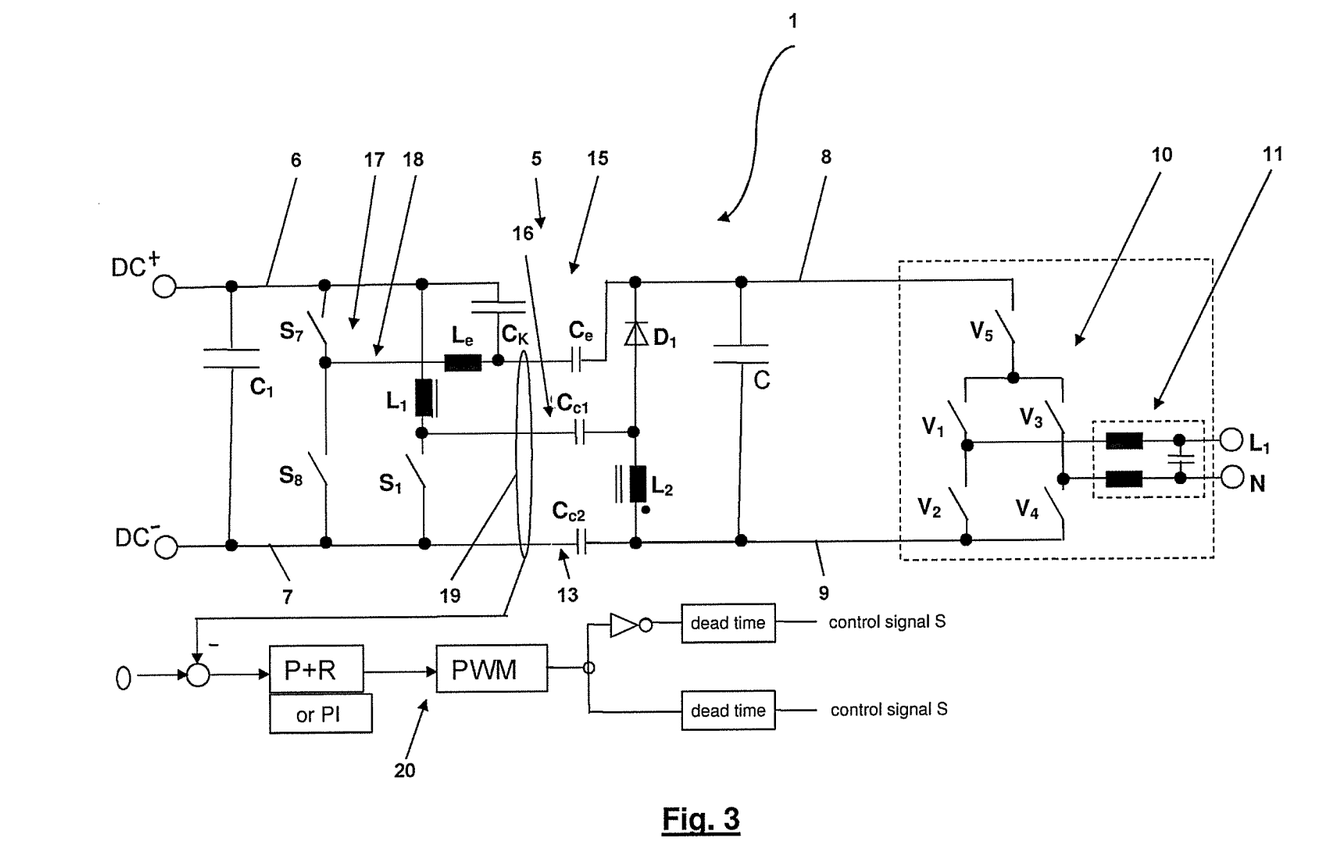
FIG. 3 illustrates a further transformerless inverter comprising a third embodiment of the DC/DC converter according to the present invention configured as a SEPIC.

FIG. 3 illustrates an inverter 1 without depiction of the DC generator 2 of FIGS. 1 and 2. Here, only the input poles DC$^+$ and DC$^-$ are indicated. The same applies to the AC power grid 4 which is represented by the terminals $L_1$ and N. The DC/DC converter 5 is here designed as a SEPIC 15 which is essentially made of an input side combination of an inductance $L_1$ and a switch $S_1$, of a coupling capacitance $C_{c1}$ and of an output side combination of an inductance $L_2$ and a diode $D_1$. As a first particularity, according to the teaching of EP 0 696 841 A1, not only the coupling capacitance $C_{c1}$ is provided in the AC current forward flow path 16 but also a coupling capacitance $C_{c2}$ in the AC current backflow path 13. Thus, a galvanic separation between the input lines 6 and 7 and the output lines 8 and 9 of the DC/DC converter 5 is achieved in a capacitive way. An auxiliary converter 17 is also provided here which in principle has the same design as the auxiliary converter 17 according to FIG. 1, even if its coupling capacitance $C_K$ is connected to the input line 6 and the connection capacitance $C_e$ is connected to the output line 8, here. This has no effect on the general function of the auxiliary converter 17 for ground current compensation in that the current sum registered via the ferrite ring 19 is made to zero by controlling the switches $S_7$ and $S_8$.

Figure 4:
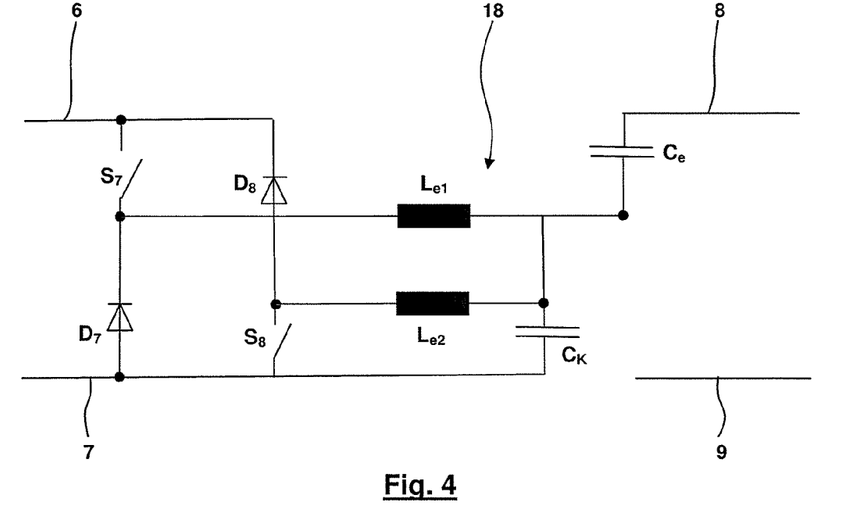
FIG. 4 illustrates an alternative embodiment of the compensation current path of the DC/DC converter according to FIG. 1.

In the compensation current path 18 which is separately depicted in FIG. 4, i.e. without the further components of the inverter 1 except for the input lines 6 and 7 and the output lines 8 and 9, the switching bridge between the input lines 6' and 7 is divided into two bridges each consisting of a switch $S_7$ and $S_8$, respectively, and a diode $D_7$ and $D_8$, respectively. Correspondingly, the inductance $L_e$ is divided into two partial inductances $L_{e1}$ and $L_{e2}$. All other components of the compensation current path 18 correspond to FIG. 1 except for that the compensation current path 18 in FIG. 4 is connected to the output line 8 at its output end. The principle function of the compensation current path 18 according to FIG. 4, however, corresponds to that one according to FIG. 1.

Figure 5:
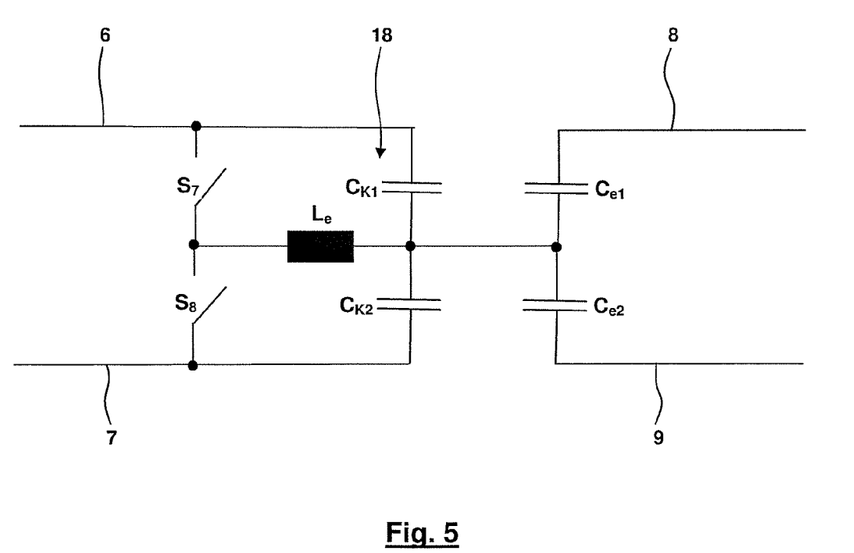
FIG. 5 illustrates even a further alternative embodiment of the compensation current path of the DC/DC converter according to FIG. 1.

This also applies to the embodiment of the compensation current path 18 according to FIG. 5. Here, not the two switches $S_7$ and $S_8$ are distributed over two bridges between the input lines 6 and 7 but the coupling capacitance $C_K$ is divided into two coupling capacitances $C_{K1}$ and $C_{K2}$. This corresponds to the capacitive coupling of the compensation current path 18 at the output side of the inductance $L_e$ to a potential which is between the potentials of the input lines 6 and 7. The connection capacitance $C_e$ via which the compensation current path 18 is connected to the output lines 8 and 9 at its input end is also divided into two connecting capacitances $C_{e1}$ and $C_{e1}$ here, which corresponds to the connection to a potential between the potentials of the output lines 8 and 9 with a connection capacitance being arranged in between. It is clear that the division of the two capacitances $C_K$ and $C_e$ may also be done independently of each other, and that one or both of these divisions are also possible in the other embodiments of the compensation current path 18 according to FIGS. 1 to 4.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A DC/DC converter for converting an input DC voltage present between two input lines at an input side of the DC/DC converter into an output DC voltage present between two output lines at an output side of the DC/DC converter, the DC/DC converter comprising:

at least one AC current forward path that is, via electric components, connected at its input end to the input lines and at its output end to the output lines, wherein at least one of the electric components between the AC current forward path and at least one of the input lines and at least one of the electric components between the AC current forward path and at least one of the output lines are switching electric components, and wherein at least one of these switching electric components is actively operated;

at least one AC current backflow path for a backflow of current flowing off via the AC current forward path, the at least one AC current backflow path being connected via at least one input side connection to at least one of the input lines at its input end and via at least one output side connection to at least one of the output lines at its output end, wherein the input side and the output side connections are same connections selected from a group of connections comprising electrically conductive connections and switching connections; and at least one auxiliary converter configured to compensate a current sum of currents flowing via the at least one AC current forward paths and the at least one AC current backflow path, the at least one auxiliary converter electrically conductively connecting one end of an additional compensation current path that runs in parallel to the at least one AC current forward path and the at least one AC current backflow path via two pulsed switches alternately to two lines at one side of the DC/DC converter, wherein the other end of the compensation current path is permanently electrically conductively connected to at least one line at the other side of the DC/DC converter via at least one connection capacitance;

wherein the input lines are galvanically separated from the output lines by capacitances arranged in the AC current path including the at least one AC current forward path, the at least one AC current backflow path and the at least one compensation current path.

2. The DC/DC converter of claim 1,
wherein the two lines at the one side of the DC/DC converter, to which the one end of the at least one compensation current path are alternately electrically conductively connected, are selected from a group of lines comprising:
 the input lines,
 intermediate potential lines carrying intermediate potentials between the input lines;
 the output lines; and
 intermediate potential output lines carrying intermediate potentials between the output lines; and
wherein the at least one line at the other side of the DC/DC converter, to which the other end of the at least one compensation current path is permanently electrically conductively connected, is selected from the same group of lines.

3. The DC/DC converter of claim 1, wherein an inductance is connected in series with the at least one connection capacitance in the compensation current path.

4. The DC/DC converter of claim 3, wherein the at least one compensation current path, at a point between the connection capacitance and the pulsed switches, is electrically conductively connected to one of the two lines at the one side of the DC/DC converter, to which the one end of the at least one compensation current path are alternately electrically conductively connected, via a coupling capacitance.

5. The DC/DC converter of claim 4, wherein the point is between the connection capacitance and the inductance.

6. The DC/DC converter of claim 1, further comprising a controller operably coupled to the at least one auxiliary converter and configured to determine a current sum of all currents flowing via the at least one AC current forward path, the at least one AC current backflow path and the at least one compensation current path, and regulate the current sum to be zero.

7. The DC/DC converter of claim 6, wherein the controller is configured to control the pulsed switches of the at least one auxiliary converter by means of pulse width modulation (PWM).

8. The DC/DC converter according to claim 1, wherein the at least one AC current forward path comprises a resonant circuit that includes a resonance inductance and a resonance capacitance, and which, at its input side, is via two pulsed switches alternately electrically conductively connected to the two input lines.

9. The DC/DC converter of claim 8, wherein one AC current backflow path is associated with each AC current forward path comprising a resonant circuit, wherein the AC current backflow path is connected to the same lines at the input side and at the output side to which the associated AC current forward path is connected.

10. The DC/DC converter of claim 1, wherein the at least one AC current backflow path, at its input side, is connected to the input lines and, at its output side, is connected to the output lines, wherein the capacitance in the AC current backflow path is arranged between its input side connections to the two input lines and its output side connections to the two output lines.

11. The DC/DC converter of claim 9, wherein each resonant circuit and its associated AC current backflow path are connectable to each other at at least one side of the DC/DC converter via a pulsed connection switch.

12. The DC/DC converter of claim 9, wherein each resonant circuit and its associated AC current backflow path are electrically conductively connected to each other at their output side via a coupling connection that is selected from a capacitance and an inductance.

13. The DC/DC converter of claim 9, wherein each resonant circuit and its associated AC current backflow path, at their input sides, are each, via two pulsed switches, connected to two input side lines and wherein a further pulsed switch is arranged in one of the input side lines, wherein the two input side lines are selected from the input lines and intermediate potential input lines carrying an intermediate potential between the input lines.

14. The DC/DC converter of claim 8, wherein the at least one AC current backflow path is connected to both input lines at its input side and to both output lines at its output side via switching connections, wherein the switching connections of at least one side each comprise a control switch, and wherein the AC current backflow path comprises a further resonant circuit including a resonance inductance in addition to the capacitance.

15. The DC/DC converter of claim 1, wherein one DC current backflow path is provided which, at its input side, is connected to the input lines via two capacitances and, at its output side, is connected to the output lines via two further capacitances.

16. The DC/DC converter of claim 1, wherein several AC current backflow paths, at their output sides, are jointly connected to the two output lines via two common capacitances.

* * * * *